(No Model.)

G. MARSH.
COW TAIL HOLDER.

No. 415,677. Patented Nov. 19, 1889.

Witnesses:
E. P. Ellis.
J. M. Nesbit.

Inventor:
Gideon Marsh,
per F. A. Lehmann,
Atty.

UNITED STATES PATENT OFFICE.

GIDEON MARSH, OF MANCELONA, MICHIGAN.

COW-TAIL HOLDER.

SPECIFICATION forming part of Letters Patent No. 415,677, dated November 19, 1889.

Application filed August 27, 1889. Serial No. 322,093. (No model.)

*To all whom it may concern:*

Be it known that I, GIDEON MARSH, of Mancelona, in the county of Antrim and State of Michigan, have invented certain new and useful Improvements in Cow-Tail Holders; and I do hereby declare the following to be a full, clear, and exact description of the invention, such as will enable others skilled in the art to which it pertains to make and use it, reference being had to the accompanying drawings, which form part of this specification.

My invention relates to an improvement in cow-tail holders; and it consists in the combination of two jaws, which form the clamp for holding the tail and one of the hind legs, and which are provided with ears through which the pivots pass, and recesses to receive the circular portion of the springs, with the springs which hold the jaws in a closed position, as will be more fully described hereinafter.

The object of my invention is to catch the tail of the cow and fasten it to one of her hind legs, so that she cannot switch her tail around while she is being milked.

Figure 1:
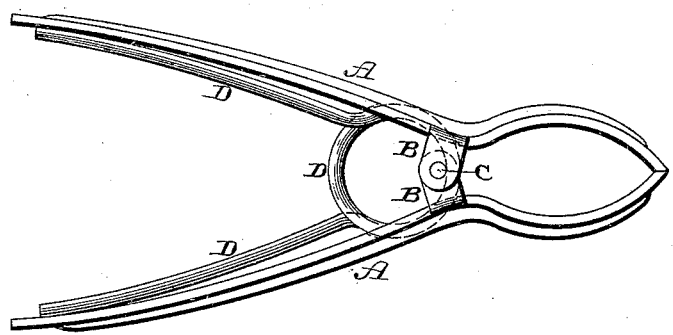
Figure 2:
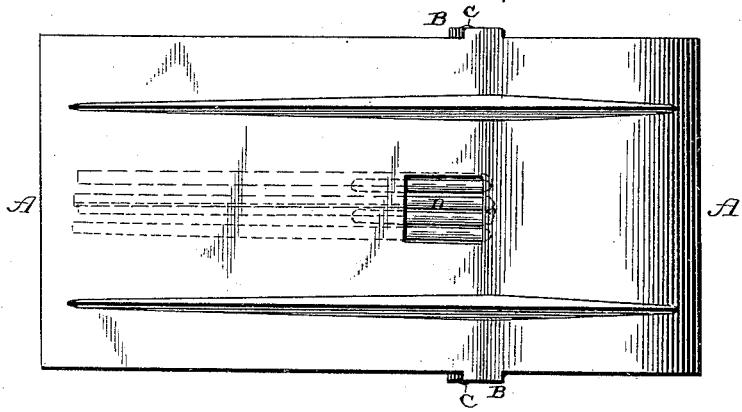

In the accompanying drawings, Figure 1 is an edge view of a holder which embodies my invention. Fig. 2 is a plan view of the same.

A represents two jaws, which are made, preferably, of the shape here shown, and which are provided with ears B upon each edge, and through these ears the pivots C are passed. The shorter ends of the jaws are made concave upon their inner sides, so as to receive the tail of the cow and to catch over the rear edge of one of her hind legs, and thus hold the tail securely, so that the cow cannot switch it around while she is being milked. These two portions of the jaws are made just long enough to receive the tail and catch hold of one of the legs above the joint, while the other ends are made long enough to form handles or levers for overcoming the tension of the springs D, which are placed between the jaws. Each of these jaws has a suitable recess or opening formed through it, and in these recesses or openings are placed opposite sides of the coiled portion of the spring or springs D, which serve to keep the jaws always closed. The outer end or ends of the spring or springs catch in between the outer ends of the jaws and serve to force them apart. The circular portion of the springs catching in the recesses in the jaws, the springs are held in position without the aid of any fastening devices of any kind. The spring must be placed in position between the jaws and so that its circular portion will catch in the recesses, and then the pivots are passed through the ears and the holder is complete.

A cow-tail holder constructed as here shown and described will not only prevent a cow from switching her tail while being milked, but by catching hold of the rear tendon of one of the legs above the joint will distract the cow's attention, so as to prevent her from kicking.

Having thus described my invention, I claim—

The combination of the two jaws provided with recesses and ears, through which the pivots are passed, with the springs placed between the jaws, the circular portion of the springs being made to catch in the recesses, whereby the springs are held in position without any other fastening, substantially as described.

In testimony whereof I affix my signature in presence of two witnesses.

GIDEON MARSH.

Witnesses:
C. L. BAILEY,
AIDGE BAKER.